US007804912B2

(12) United States Patent
Luz et al.

(10) Patent No.: US 7,804,912 B2
(45) Date of Patent: *Sep. 28, 2010

(54) METHOD AND APPARATUS FOR ENCRYPTION OF OVER-THE-AIR COMMUNICATIONS IN A WIRELESS COMMUNICATION SYSTEM

(75) Inventors: Yuda Y. Luz, Buffalo Grove, IL (US); Ronald T. Crocker, St. Charles, IL (US); John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 1206 days.

This patent is subject to a terminal disclaimer.

(21) Appl. No.: 11/209,058

(22) Filed: Aug. 22, 2005

(65) Prior Publication Data

US 2006/0062320 A1 Mar. 23, 2006

Related U.S. Application Data

(60) Provisional application No. 60/612,596, filed on Sep. 23, 2004.

(51) Int. Cl.
*H03C 5/00* (2006.01)
*H03D 5/00* (2006.01)
*H03K 7/10* (2006.01)
*H03K 9/10* (2006.01)

(52) U.S. Cl. .................. 375/269; 375/260; 375/295; 370/208; 370/210

(58) Field of Classification Search .................. 375/260, 375/269, 295; 370/208, 210
See application file for complete search history.

(56) References Cited

U.S. PATENT DOCUMENTS

| 5,838,797 | A | 11/1998 | Iwasaki |
| 5,970,047 | A | 10/1999 | Suzuki |
| 6,157,679 | A | 12/2000 | Johnson |
| 6,480,522 | B1 | 11/2002 | Hoole et al. |
| 7,515,714 | B2 | 4/2009 | Orihashi et al. |

(Continued)

FOREIGN PATENT DOCUMENTS

JP 04-081139 A 3/1992

(Continued)

OTHER PUBLICATIONS

S. Chhim, "Canadian Counterpart 2,580,106 - 1st Office Action," Canadian Intellectual Property Office, Gatineau, Quebec, Canada, May 12, 2010, 1 page.

(Continued)

*Primary Examiner*—Curtis B Odom
(74) *Attorney, Agent, or Firm*—Steven A. May

(57) ABSTRACT

A communication device converts a bit stream to multiple symbols and provides encryption at a physical layer by shifting a phase of each symbol of the multiple symbols to produce multiple encrypted symbols. Each encrypted symbol of the multiple encrypted symbols is modulated with an orthogonal subcarrier to produce at least one modulated subcarrier and the at least one modulated subcarrier is then transmitted via a wireless link. On a receive side, a receiving communication device receives the transmitted, encrypted symbols and provides decryption at a physical layer by shifting a phase of each encrypted symbol in correspondence with the phase used to encrypt the symbol at the transmit side.

17 Claims, 7 Drawing Sheets

U.S. PATENT DOCUMENTS

| | | | |
|---|---|---|---|
| 7,564,908 B2* | 7/2009 | Luz et al. | 375/260 |
| 2001/0021182 A1* | 9/2001 | Wakutsu | 370/344 |
| 2002/0037311 A1 | 3/2002 | Fikstad et al. | |
| 2002/0122465 A1 | 9/2002 | Agee et al. | |
| 2004/0008616 A1* | 1/2004 | Jung et al. | 370/203 |
| 2006/0045193 A1* | 3/2006 | Stolpman et al. | 375/260 |

FOREIGN PATENT DOCUMENTS

| | | |
|---|---|---|
| JP | 08-181727 A | 12/1996 |
| JP | 09-321721 A | 12/1997 |
| JP | 2004-032679 A | 1/2004 |

OTHER PUBLICATIONS

Chinese Examiner, "Chinese Counterpart 200580032005.1 - Notification of the First Office Action," The State Intellectual Property Office of the Peoples Republic of China, Beijing, China, Jul. 10, 2009, 19 pages, most relevant pp. 1-11.

Japanese Examiner, "Japanese Counterpart 2007-533530 - Notification of Reasons for Rejection," Japanese Patent Office, Tokyo, Japan, Jun. 29, 2010, 10 pages.

Korean Examiner, "Korean Counterpart 10-2007-7006612 - The Examiner's Grounds for Rejection," Korean Intellectual Office, Daejeon, Republic of Korea, Mar. 12, 2008, 5 pages, most relevant pp. 1-2.

Korean Examiner, "Korean Counterpart 10-2007-7006612 - KIPO's Notice of Preliminary Rejection," Korean Intellectual Property Office, Daejeon, Republic of Korea, Feb. 16, 2009, 4 pages, most relevant pp. 1.

Ing. Marcos Mendez Marin, "Mexican Counterpart MX/a/2007/003452 - Official Action," Instituto Mexicano de la Propiedad Industrial, Mexico, Aug. 6, 2009, 8 pages, most relevant pp. 1-4.

* cited by examiner

METHOD AND APPARATUS FOR ENCRYPTION OF OVER-THE-AIR COMMUNICATIONS IN A WIRELESS COMMUNICATION SYSTEM

CROSS-REFERENCES TO RELATED APPLICATION(S)

This application claims priority from provisional application Ser. No. 60/612,596, entitled "METHOD AND APPARATUS FOR ENCRYPTION OF OVER-THE-AIR COMMUNICATIONS IN A WIRELESS COMMUNICATION SYSTEM," filed Sep. 23, 2004, which is commonly owned and incorporated herein by reference in its entirety. In addition, this application is related to U.S. patent application Ser. No. 10/947,724, filed on Sep. 23, 2004, and U.S. patent application Ser. No. 11/209,058, filed on Aug. 8, 2005.

FIELD OF THE INVENTION

The present invention relates generally to wireless communication systems, and more specifically to encryption of over-the-air communications in a wireless communication system.

BACKGROUND OF THE INVENTION

In a typical wireless communication system, a session key is distributed among the transmitting and receiving communication devices when a communication session is set up. The session key is then used by the transmitting communication to perform Layer 2 or Layer 3 encryption on data transmitted over-the-air. No physical layer, that is, Layer 1, encryption is performed, that is, there is no encryption of the modulated waveform. In addition, typically only the user data is encrypted and not the pilot symbols and synchronization symbols, which symbols must be used as a reference for timing synchronization and fading recovery.

The performance of Layer 2 or Layer 3 encryption leaves the data vulnerable to decryption by an intercepting communication device that either intercepts the session key or that decrypts the data by application of brute force. Therefore, a need exists for a method and apparatus that makes an air interface more secure against decryption by an undesired interceptor of a communication in a wireless communication system.

DETAILED DESCRIPTION OF THE INVENTION

Figure 1:
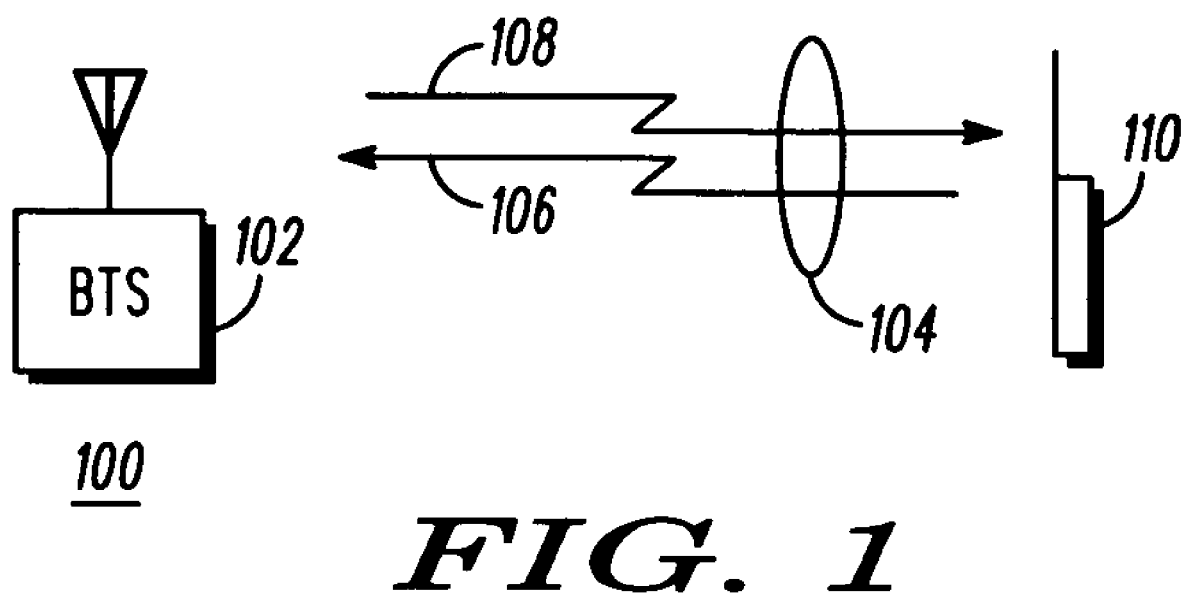
FIG. 1 is a block diagram of a wireless communication system in accordance with an embodiment of the present invention.

To address the need for a method and apparatus that makes an air interface more secure against decryption by an undesired interceptor of a communication in a wireless communication system, a communication device is provided that converts a bit stream to multiple symbols and provides encryption at a physical layer by shifting a phase of each symbol of the multiple symbols to produce multiple encrypted symbols. Each encrypted symbol of the multiple encrypted symbols is modulated with an orthogonal subcarrier to produce at least one modulated subcarrier and the at least one modulated subcarrier is then transmitted via a wireless link. On a receive side, a receiving communication device receives the transmitted, encrypted symbols and provides decryption at a physical layer by shifting a phase of each encrypted symbol in correspondence with the phase used to encrypt the symbol at the transmit side.

Generally, an embodiment of the present invention encompasses a method for encrypting a wireless transmission. The method includes receiving multiple symbols, shifting a phase of each symbol of the multiple symbols to produce multiple phase shifted symbols, modulating each phase shifted symbol of the multiple phase shifted symbols with an orthogonal subcarrier to produce at least one modulated subcarrier, and transmitting the at least one modulated subcarrier via a wireless link.

Another embodiment of the present invention encompasses a method for receiving an encrypted wireless transmission. The method includes receiving at least one modulated subcarrier via a wireless link, demodulating the at least one modulated subcarrier to produce a plurality of encrypted symbols, and applying a phase shift to each encrypted symbol of the plurality of encrypted symbols to produce a plurality of decrypted symbols.

Yet another embodiment of the present invention encompasses a communication device having a signal processing unit coupled to a transmitter section. The signal processing unit comprises a phase shifter that receives multiple symbols and applies a phase shift to each symbol of the multiple symbols to produce multiple phase shifted symbols. The signal processing unit further comprises an orthogonal modulator that receives the multiple phase shifted symbols and modulates each phase shifted symbol of the multiple phase shifted symbols with an orthogonal subcarrier to produce at least one modulated subcarrier. The transmitter section transmits the at least one modulated subcarrier via a wireless link.

Still another embodiment of the present invention encompasses a communication device having a signal processing unit that includes an orthogonal modulator and that is coupled to a transmitter section. The orthogonal modulator comprises a serial-to-parallel converter that assigns each symbol of the multiple symbols to a frequency sub-band of multiple frequency sub-bands to produce multiple assigned symbols and a phase shifter module that produces multiple phase shifted symbols, wherein the phase shifter module comprises multiple phase shifters and wherein each phase shifter of the multiple phase shifters receives an assigned symbol of the multiple assigned symbols and shifts a phase of the assigned symbol to produce a phase shifted symbol. The orthogonal modulator further comprises a transformer that transforms each phase shifted symbol of the multiple phase shifted symbols to a time domain subcarrier associated with the symbol's frequency sub-band to produce multiple modulated time domain subcarriers, wherein the multiple modulated subcarriers are in a parallel form, and a parallel-to-serial converter that converts the multiple modulated subcarriers from a parallel form to a serial form to produce an output signal. The transmitter section transmits the multiple phase shifted symbols via a wireless link.

Yet another embodiment of the present invention encompasses a communication device comprising a receiver section coupled to a signal processing unit. The receiver section receives a modulated carrier via a wireless link and downconverts the modulated carrier to produce a downconverted signal. The signal processing unit includes an orthogonal demodulator that receives the downconverted signal and demodulates the downconverted signal to produce a stream of encrypted symbols and a phase shifter that receives the stream of encrypted symbols and applies a phase shift to each symbol of the stream of encrypted symbols to produce a plurality of decrypted symbols.

Still another embodiment of the present invention encompasses a communication device comprising a receiver section coupled to a signal processing unit. The receiver section receives a modulated carrier via a wireless link and downconverts the modulated carrier to produce a downconverted signal. The signal processing unit includes an orthogonal modulator that comprises a serial-to-parallel converter that assigns the downconverted signal to multiple time domain subcarriers and an inverse transformer that transforms each time domain subcarrier of the multiple time domain subcarriers to a frequency domain subcarrier to produce multiple encrypted symbols, wherein the multiple encrypted symbols are in a parallel form. The signal processing unit further includes a phase shifter module that produces multiple decrypted symbols, wherein the phase shifter module comprises multiple phase shifters and wherein each phase shifter of the multiple phase shifters receives an encrypted symbol of the multiple encrypted symbols and shifts a phase of the encrypted symbol to produce a decrypted symbol, and a parallel-to-serial converter that converts the multiple decrypted symbols from a parallel form to a serial form to produce a stream of decrypted symbols.

The present invention may be more fully described with reference to FIGS. 1-8. FIG. 1 is a block diagram of a wireless communication system 100 in accordance with an embodiment of the present invention. Communications system 100 includes a base transceiver station (BTS) 102 that is capable of engaging in wireless communications with a mobile station (MS) 110, such as a cellular telephone, radiotelephone, or wireless data modem, via an air interface 104. Air interface 104 includes a forward link 108 that comprises traffic, pilot, paging, and signaling channels. Air interface 104 further includes a reverse link 106 that comprises traffic, access, and signaling channels.

Preferably, communication system 100 is an Orthogonal Frequency Division Multiplexing (OFDM) communication system. OFDM is a wideband modulation scheme that divides a frequency bandwidth allocated for a communication session into multiple narrower frequency sub-bands. Each sub-band includes a radio frequency (RF) subcarrier, wherein each subcarrier is mathematically orthogonal to the RF subcarrier included in each of the other subchannels. The orthogonality of the subcarriers allows their individual spectra to overlap without causing interference with the other carriers. However, those who are of ordinary skill in the art realize that communication system 100 may operate in accordance with any wireless telecommunication system that uses an orthogonal modulation scheme for modulation of information onto a carrier and subsequent transmission of the modulated signal, such as a Code Division Multiple Access (CDMA) communication system, a CDMA 2000 communication system, a General Packet Radio Service (GPRS) communication system, or a Wideband CDMA (WCDMA) communication system. In CDMA, the subcarriers are not of different frequency but of different code domain. They are called Walsh codes in IS2000, and in UMTS they are called Orthogonal Vector Spreading Factors (OVSF).

Figure 2:
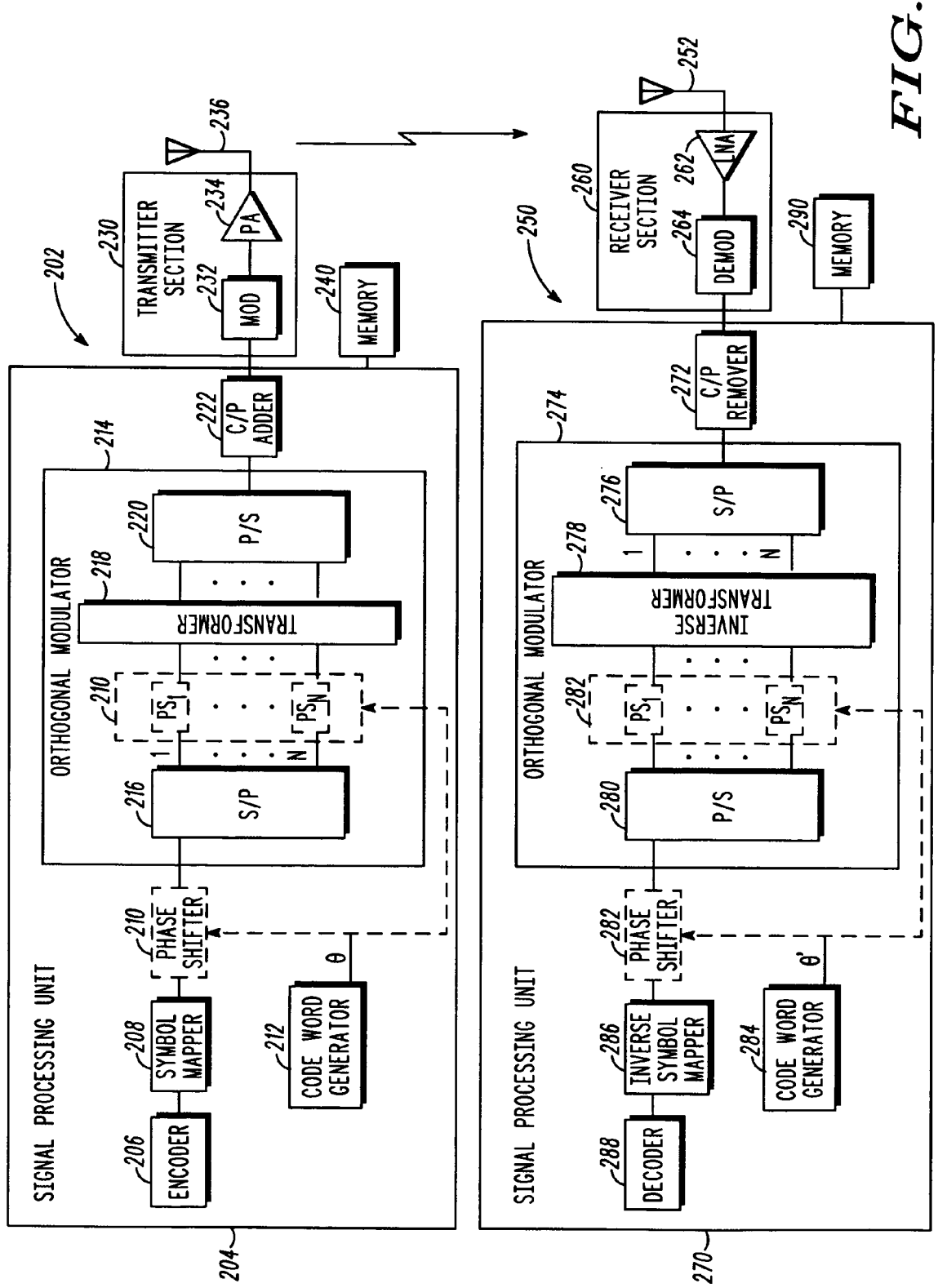
FIG. 2 is a block diagram of an architecture of the communication system of FIG. 1 in accordance with various embodiments of the present invention.

FIG. 2 is a block diagram of an architecture of communication system 100 in accordance with an embodiment of the present invention. On a transmit side of communications system 100, a transmitting communication device 202, such as BTS 102, receives a bit stream, converts the bit stream to a corresponding symbol stream, provides encryption at a physical layer by encrypting the symbol stream to produce an encrypted symbol stream, and transmits the encrypted symbol stream via an air interface, such as air interface 104. On a receive side of communications system 100, a receiving communication device 250, such as MS 110, receives the transmitted, encrypted symbol stream and provides decryption at a physical layer by decrypting the received symbols to recover the bits of the transmitted bit stream corresponding to each received data symbol. However, those who are of ordinary skill in the art realize that BTS 102 and MS 110 are each capable of operating as either a transmitting communication device or a receiving communication device with respect to the embodiments of the present invention.

Each of transmitting communication device 202 and receiving communication device 250 includes a respective signal processing unit 204, 270, such as one or more microprocessors, microcontrollers, digital signal processors (DSPs), combinations thereof or such other devices known to those having ordinary skill in the art. Each of transmitting communication device 202 and receiving communication device 250 further includes a respective at least one memory device 240, 290 associated with the respective signal processing unit, such as random access memory (RAM), dynamic random access memory (DRAM), and/or read only memory (ROM) or equivalents thereof, that maintains data and programs that may be executed by the signal processing unit and that allow the signal processing unit to operate in communication system 100. Each of transmitting communication device 202 and receiving communication device 250 further maintains in their respective at least one memory device 240, 290 a session key that is exchanged by the transmitting and receiving communication devices during a set up of a communication session between the two devices as is know in the art. Each of transmitting communication device 202 and receiving communication device 250 may further maintain, in their respective at least one memory device 240, 290, a mobile serial number that is uniquely associated with MS 110. As those who are of ordinary skill in the art are aware, the various functions of signal processing units 204, 270 as described herein may alternatively be implemented in hardware circuitry, such as a programmable logic array (PLA) or an application specific integrated circuit (ASIC).

Figure 3:
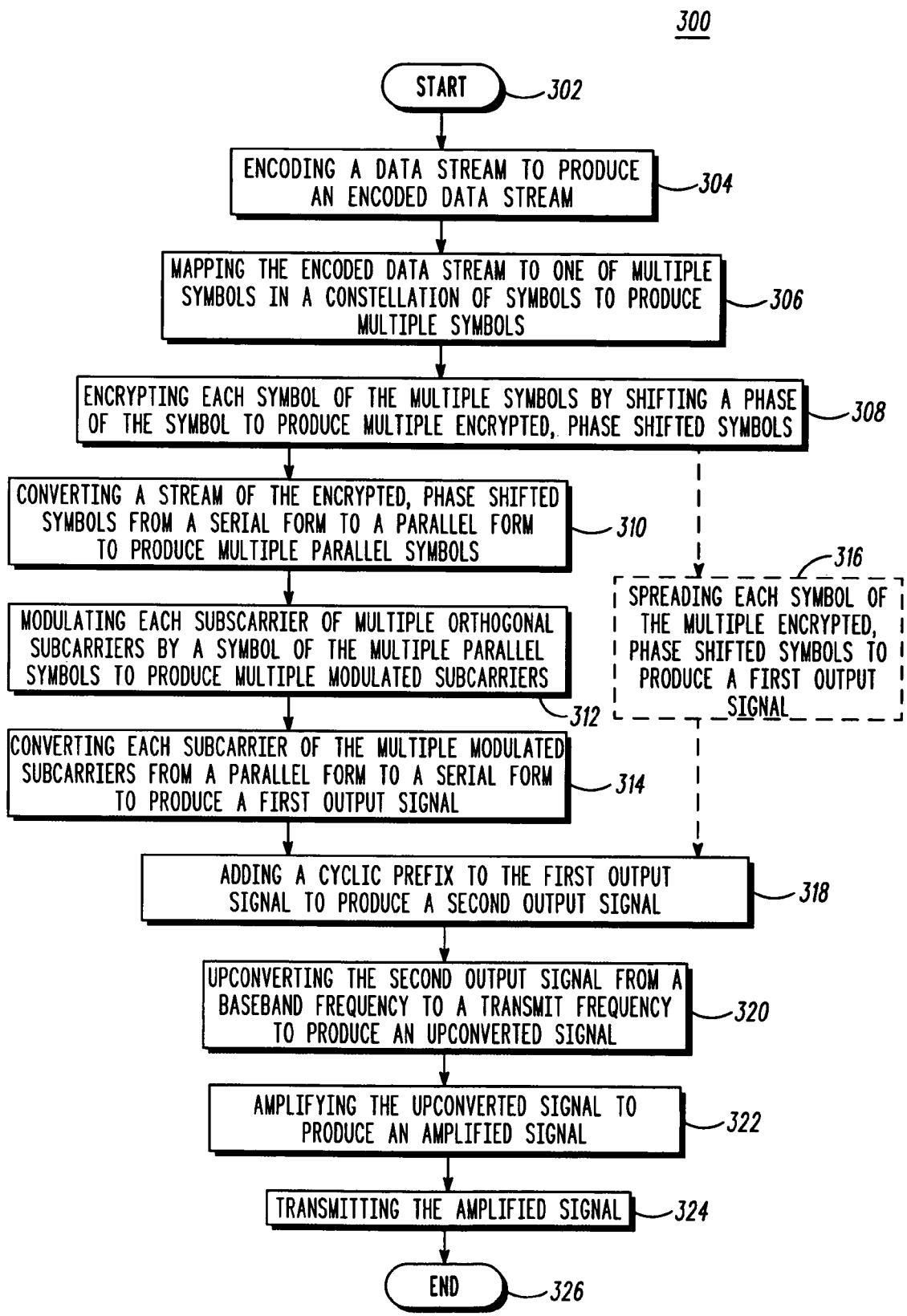
FIG. 3 is a logic flow diagram illustrating an operation of a transmit side of the communication system of FIG. 2 in accordance with various embodiments of the present invention.

Referring now to FIG. 3, a logic flow diagram 300 is depicted that illustrates an operation of transmit side 202 in communication system 100 in accordance with an embodiment of the present invention. Logic flow 300 begins (302) when a data source (not shown) provides input data in a binary format, such as bits, to an encoder 206. Encoder 206 encodes (304) the bit stream by applying an error correcting code, such as a forward error correction code (FEC), to the data. For example, encoder 206 may encode the data by use of a convolutional code such as a Viterbi coding algorithm, however, a block code may be used. Convolutional codes and block codes are well known in the art and will not be described in greater detail. The type of error correcting code used is not critical to the invention and those of ordinary skill in the art are aware of many types of error correction codes that may be applied to the data without departing from the spirit and scope of the present invention. Regardless, the output of encoder 206 includes information preferably represented in a binary data (bits) format. A bit stream output by encoder 206 is then provided to a symbol mapper 208.

In another embodiment of the present invention, wherein the input data includes multiple data-types, such as user data, pilot data, and synchronization data, only the user data is encoded and the one or more other data-types, that is, the pilot data and the synchronization data, is not encoded. In such an embodiment, symbol mapper 208 may comprise multiple symbol mappers, wherein the user data is encoded before being provided to a first symbol mapper of the multiple symbol mappers and the other data-types are each directly conveyed to a respective other symbol mapper of the multiple symbol mappers.

Symbol mapper 208, or each of the multiple symbol mappers when symbol mapper 208 comprises multiple symbol mappers, groups the bit stream received by the symbol mapper into groups of P bits (P-tuples) and maps (306) each P-tuple to a corresponding symbol to produce a symbol stream. To this end, a signal constellation that includes M possible symbols is defined within a multi-dimensional space, preferably a complex two-dimensional (I,Q) space. Each symbol comprises a point within the two-dimensional space, which point may be represented as a vector sum of two scaled basis vectors 'I' and 'Q'. The respective amplitudes of the two basis vectors used to define a particular point may be thought of as two-dimensional coordinates of the point. In order to achieve the desired mapping, symbol mapper 208 assembles the binary values (bits) output by encoder 204 into a P-tuple. Each P-tuple is then used to select a symbol out of the M possible symbols, wherein $M=2^P$. In one embodiment, a MPSK modulation scheme, such as BPSK or QPSK, is applied to each P-tuple; however those who are of ordinary skill in the art realize that there are many types of multi-dimensional symbol mapping schemes, such as other MPSK schemes or a multiple quadrature amplitude modulation (MQAM) scheme, that may be used without departing from the spirit and scope of the present invention.

Communication system 200 may further include an interleaving block on transmit side 202 that interleaves the symbols produced by the symbol mapper 208 in order to minimize the error producing impact of a bursty channel. In one embodiment of the present invention, block interleaving may be used wherein the symbol stream is read into the rows of a two-dimensional matrix and read out column-wise, resulting in the separation of any two adjacent symbols in the symbol stream. When the transmitted symbols are received and deinterleaved by the inverse interleaving block, any error bursts introduced by the channel are broken up, reducing the impact of the error and augmenting the ability of the forward error correction code to correct such errors.

Symbol mapper 208 conveys the symbol stream to a phase shifter 210. Phase shifter 210 then encrypts (308) each symbol received by the phase shifter by shifting a phase of the symbol to produce an encrypted, phase shifted symbol. Signal processing unit 204 determines the phase shift based on a code word 'θ' output by a code word generator 212 coupled to phase shifter 210. Preferably, the code word is derived from one or more of the session key exchanged by transmit side 202 and receive side 250 when the communication session is set up and the mobile serial number that is uniquely associated with MS 110.

When the communication session between transmitting communication device 202 and receiving communication device 250 is set up, signal processing units 204 initializes code word generator 212 by inputting the session key, typically a string of bits, or a string of bits derived from the session key, and/or the mobile serial number, or a string of bits derived from the mobile serial number, into code word generator 212. In correspondence with each symbol input into amplitude and phase adjuster 210, amplitude and phase adjuster 210 reads bits of the output of code word generator 212. Signal processing unit 204 then determines a phase shift based on the read bits.

As is known in the art, data is transmitted over the air in groupings known as frames. After the communication session is set up, each time transmit side 202 starts a new frame, signal processing unit 204 re-initializes code word generator 212 so that the first, in time, symbols encrypted for embedding in the new frame are encrypted based on the re-initialized code word generator 212. The header of the new frame includes a New Frame Indicator (NFI), indicating that this is a new frame, and the NFI indicates to receiving communication device 250 that the receiving communication device should re-initialize its code word generator as well. Thus synchronization is maintained between the code word generators of transmit side 202 and receive side 250.

Phase shifter 210 conveys the stream of encrypted, phase shifted symbols to an orthogonal modulator 214. When symbol mapper 208 comprises multiple symbol mappers that each maps a data-type of multiple data-types to a constellation of symbols, only the symbol mapper that produces a symbol stream based on user data conveys the produced symbol stream to phase shifter 210. Phase shifter 210 then shifts a phase of each symbol associated with user data to produce a stream of encrypted, that is, phase shifted, symbols that is conveyed to orthogonal modulator 214. Each of the other symbol mappers, which produces a symbol stream based associated with non-user data, bypasses phase shifter 210 and conveys the non-encrypted, that is, non-shifted, symbol stream directly to orthogonal modulator 214.

Orthogonal Modulator 214 modulates each symbol received by the orthogonal modulator with an orthogonal subcarrier, such as one of multiple frequency sub-bands in an OFDM communication system or an orthogonal code or OVSF in a CDMA communication system. In one embodiment of the present invention, an OFDM embodiment, orthogonal modulator 214 comprises a serial-to-parallel (S/P) converter 216 coupled to a transformer 218, which transformer is further coupled to a parallel-to-serial (P/S) converter 220. In response to receiving each symbol, orthogonal modulator 214 routes the received symbol to S/P converter 216. S/P converter 216 assigns (310) each symbol to one of multiple ('N') orthogonal subcarriers, that is, frequency sub-bands, in effect converting the symbol stream received from phase shifter 210 from a serial to a parallel form and producing N parallel symbols, wherein N is the number of subcarriers contained in a frequency bandwidth allocated for a communication session. S/P converter 216 then applies the N parallel symbols to transformer 218. When the symbols received by orthogonal modulator 214 are associated with multiple data types, such as user data, pilot data, and synchronization data, S/P converter 216 assigns each symbol associated with a same data-type to an orthogonal subcarrier from a same set of one or more orthogonal subcarriers. That is, the symbols associated with user data may be assigned to one or more orthogonal subcarriers from a first set orthogonal subcarriers, the symbols associated with pilot data may be assigned to one or more orthogonal subcarriers from a second set of orthogonal subcarriers, and the symbols associated with synchronization data may be assigned to one or more orthogonal subcarriers from a third set of orthogonal subcarriers.

Transformer 218 transforms (312) each symbol of the N parallel symbols, which symbol is assigned to a frequency sub-band, that is, a frequency domain subcarrier, to a time domain signal, that is, a time domain subcarrier, thereby producing multiple (N) modulated orthogonal time domain subcarriers, wherein each subcarrier corresponds to a sub-band included in the frequency band. The multiple orthogonal frequency sub-bands $f_n(t)$, $n=0, 1, \ldots, N-1$ can be thought of as sinusoids or complex exponentials of the form $e^{j2\Pi(W/N)nt}$ for $t \in [0, T_{total}]$ where W is the available frequency bandwidth and W/N expresses the frequency spacing between subcarriers.

As known in OFDM systems, the functionality of transformer 218 may be implemented with an inverse fast Fourier transform (IFFT), or alternatively with an inverse discrete Fourier transform (IDFT). The N parallel symbols are provided as input to the IFFT and the IFFT outputs N parallel time domain subcarriers of frequency $f_n$, wherein each subcarrier of the N parallel subcarriers is modulated by a corresponding input symbol of the N parallel input symbols. The modulated time domain subcarriers constituting the IFFT output are then conveyed to P/S converter 220.

In another embodiment of the present invention, phase shifter 210 may comprise a phase shifter module that is interposed between S/P converter 216 and transformer 218 instead of preceding the S/P converter. In such an embodiment, phase shifter 210 may comprise multiple phase shifters, $PS_1$-$PS_N$, wherein each phase shifter of the multiple phase shifters is associated with, and receives from S/P converter 216, a symbol of the multiple ('N') parallel symbols output by the S/P converter. Each phase shifter of the multiple phase shifters $PS_1$-$PS_N$ is further associated with a corresponding one of the multiple ('N') frequency sub-bands. In conjunction with each set of 'N' parallel symbols received by the multiple phase shifters $PS_1$-$PS_N$, each such phase shifter receives a code word θ produced by code word generator 212 that is different from the code word provided to the other phase shifters of the multiple phase shifters $PS_1$-$PS_N$. In response to receiving a symbol and a code word, each phase shifter of the multiple phase shifters $PS_1$-$PS_N$ encrypts the symbol by shifting a phase of the symbol, which phase shift is based on the code word, to produce an encrypted, phase shifted symbol. Each phase shifter $PS_1$-$PS_N$ then applies the phase shifted symbol to transformer 218 for transformation from a corresponding frequency sub-band, that is, a frequency domain subcarrier, to a corresponding time domain signal, that is, a time domain subcarrier.

In the embodiment of the present invention wherein symbol mapper 208 comprises multiple symbol mappers that each maps a different data-type to a constellation of symbols, only the assigned symbols output by S/P converter 216 that are associated with user data are conveyed to one of the multiple phase shifters $PS_1$-$PS_N$. The other assigned symbols bypass phase shifter 210 and are conveyed by S/P converter 216 directly to transformer 218. Each phase shifter of multiple phase shifters $PS_1$-$PS_N$ receives an assigned symbol associated with the user data and shifts a phase of the symbol to produce a phase shifted symbol that is conveyed to transformer 218. Transformer 218 then transforms each phase shifted symbol received from a phase shifter $PS_1$-$PS_N$ from a corresponding frequency sub-band, that is, a frequency domain subcarrier, to a corresponding time domain signal, that is, a time domain subcarrier, to produce a modulated time domain subcarrier associated with the user data. Transformer 218 further transforms each non-phase shifted symbol received directly from S/P converter 216 from a corresponding frequency sub-band, that is, a frequency domain subcarrier, to a corresponding time domain signal, that is, a time domain subcarrier, to produce a modulated time domain subcarrier associated with the non-user data. The modulated time domain subcarriers resulting from the transformation of the multiple phase shifted and non-phase shifted symbols are then conveyed to P/S converter 220.

P/S converter 220, preferably a multiplexer, converts (314) the time domain subcarriers received from transformer 218 from a parallel form to a serial form to produce a first output signal. P/S converter 220 conveys the first output signal to a cyclic prefix (C/P) adder 222 that appends (318) a guard band interval, or cyclic prefix, to the first output signal to produce a second output signal. Typically, the appending of a cyclic prefix comprises an appending of the last $T_g$ seconds of each OFDM symbol as a prefix to itself. Preferably $T_g$ is a preassigned length of 16 taps, or 0.8 μs; however, those of ordinary skill in the art realize that the preassigned length of the cyclic prefix is up to the designer of the system as the designer weighs the greater protection afforded by a longer cyclic prefix against the inefficiency of a longer prefix. C/P adder 222 conveys the second output signal to a transmitter section 230 of transmit side 202 that is coupled to signal processing unit 204. Transmitter section 230 includes a modulator 232 coupled to an amplifier 234. Transmitter section 230 routes the second output signal to modulator 232. Modulator 232 upconverts (320) the second output signal from a baseband frequency to a transmit frequency to produce an upconverted signal. The upconverted signal is conveyed to power amplifier (PA) 234 that amplifies (322) the signal to produce an amplified signal and transmits (324) the amplified signal via an antenna 236 and air interface 104. Logic flow 300 then ends (326).

In another embodiment of the present invention, a CDMA embodiment, orthogonal modulator 214 may comprise at least one spreader instead of an S/P converter, transformer, and P/S converter. In such an embodiment, the at least one spreader spreads (316) the phase shifted symbol received from phase shifter 210 by an orthogonal spreading code, that is, a CDMA subcarrier, to produce the first output signal, that is, a stream of modulated, that is, spread, symbols. For example, orthogonal modulator 214 may comprise multiple serial spreaders, wherein one spreader of the multiple spreaders spreads each symbol with a long code and another spreader of the multiple spreaders spreads the symbol with a Walsh code or an OVSF. When the symbols conveyed to orthogonal modulator 214 comprises symbols associated with multiple data-types, the orthogonal modulator spreads each received symbol by an orthogonal spreading code assigned to the corresponding data-type to produce a modulated subcarrier. The spread symbols are then conveyed to transmitter section 230. That is, the symbols associated with user data may be spread by a first one or more orthogonal subcarriers, that is, spreading codes, the symbols associated with pilot data may be spread by a second one or more orthogonal subcarriers, and the symbols associated with synchronization data may be spread by a third one or more orthogonal subcarriers. In the CDMA embodiment, signal processing unit 204 may or may not include C/P adder 222 interposed between orthogonal modulator 214 and transmitter section 230, which C/P adder may add a prefix to the stream of spread symbols output by the orthogonal modulator.

Figure 4:
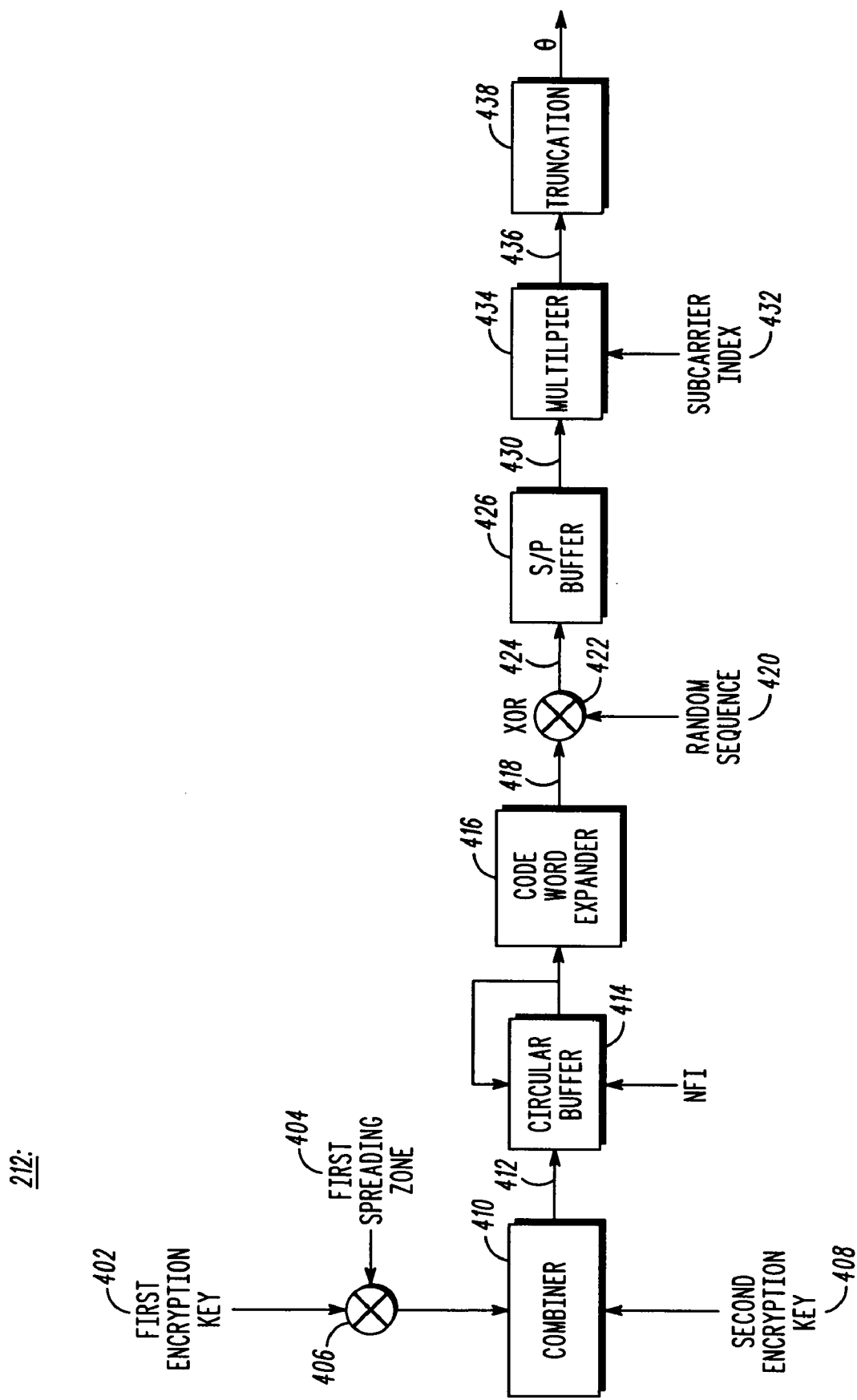
FIG. 4 is a block diagram of a code word generator of the transmit side of FIG. 2 in accordance with an embodiment of the present invention.
Figure 5:
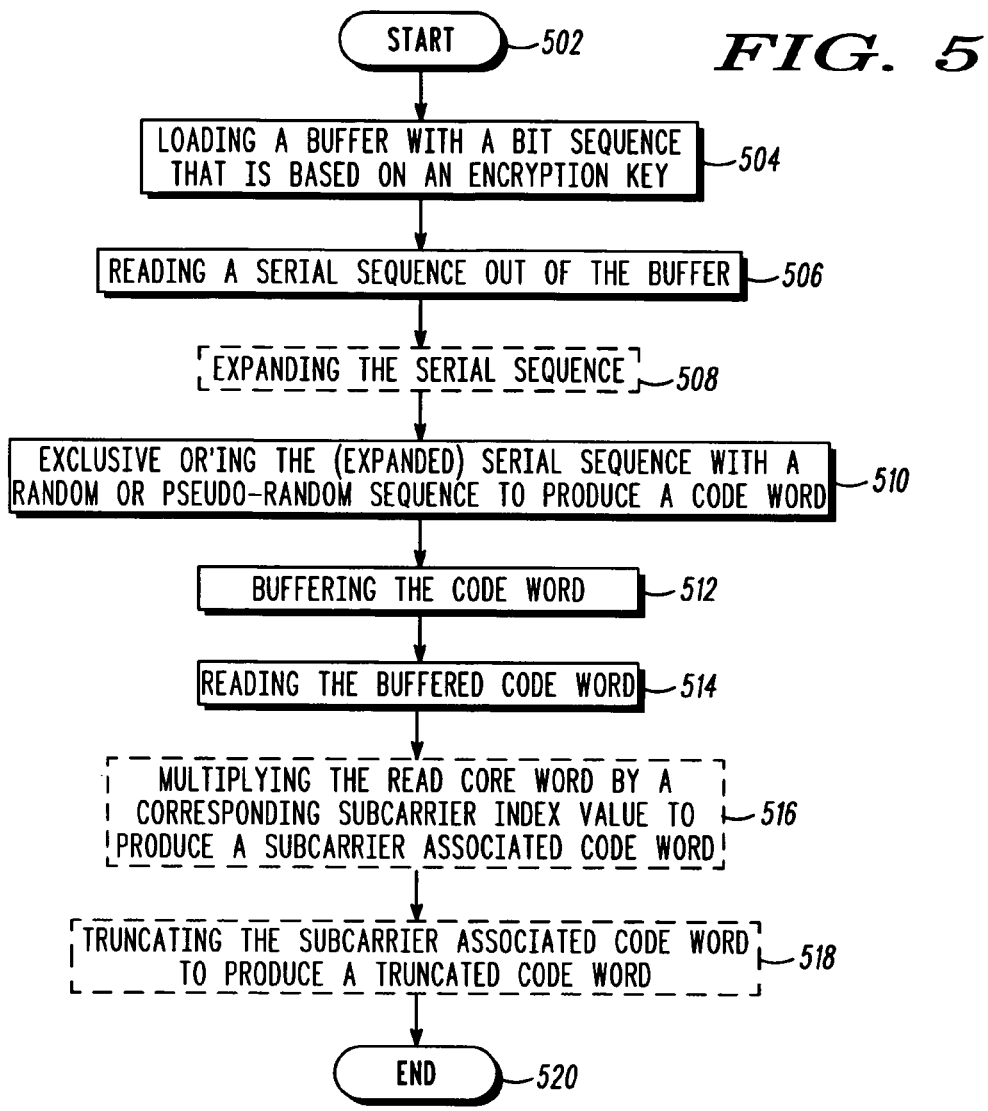
FIG. 5 is a logic flow diagram illustrating an operation of the code word generator of the transmit side of FIG. 2 in accordance with various embodiments of the present invention.

Referring now to FIGS. 4 and 5, an operation of code word generator 212 is illustrated in accordance with an embodiment of the present invention. FIG. 4 is a block diagram of code word generator 212 in accordance with an embodiment of the present invention. FIG. 5 is a logic flow diagram 500 illustrating a method by which code word generator 212 generates the code word 'θ' used by phase shifter 210 to shift a phase of the symbol received by the phase shifter in accordance with an embodiment of the present invention.

Logic flow diagram 500 begins (502) when a circular buffer 414 of code word generator 212 is loaded (504) with a bit sequence that is used to produce the code word 'θ.' Circular buffer 514 is initially loaded when the communication session is set up and is reloaded each time transmitting communication device 202 starts a new frame. That is, as is known in the art, data is transmitted in frames. Each time a new frame is assembled by signal processing unit 204, the signal processing unit re-initializes circular buffer 414 so that the first, in time, symbols encrypted for embedding in the new frame are encrypted based on the re-initialized circular buffer. The header of the new frame includes a New Frame Indicator (NFI), indicating that this is a new frame, and the NFI indicates to receiving communication device 250 that the receiving communication device should re-initialize its circular buffer as well. Thus synchronization is maintained between the code word generators of the transmitting and receiving communication devices 202, 250.

Preferably, circular buffer 414 is loaded with a bit sequence as follows. Signal processing unit 204 provides, and combiner 410 receives a first encryption key 402. Preferably first encryption key 402 is a dynamic, 16 bit key that is valid only for the duration of the call or for a single packet burst, such as a 16 bit key that is derived from a session key exchanged by transmitting communication device 202 and receiving communication device 250 during set up of the communication session and maintained in the at least one memory device 240. In one embodiment of the present invention, first encryption key 402 may be conveyed to combiner 410 via a mixer 406, where the first encryption key is spread by a first spreading code 404 that is maintained in each of the at least one memory devices 240, 290 of each of transmitting communication device 202 and receiving communication device 250. In another embodiment of the present invention, first encryption key 402 may be conveyed directly to combiner 410.

Signal processing unit 204 further provides, and combiner 410 receives, a second encryption key 408. Preferably second encryption key 408 is a static, 48 bit key that is unique to MS 110, such as a mobile serial number, for example an Electronic Serial Number (ESN), uniquely associated with the MS and is maintained in the at least one memory device 240 of transmitting communication device 202.

Combiner 410 combines the received first encryption key 402 and the received second encryption key 408 to produce a first code word 412 for input into circular buffer 414. Preferably code word 412 is 64 bits long, wherein the 16 most significant bits are derived from first encryption key 402 and the remaining 48 bits are derived from second encryption key 408. However, one of ordinary skill in the art realizes the algorithm used to combine first encryption key 402 and second encryption key 408 is not critical to the present invention and that any of a variety of algorithms may be used by combiner 410 to combine the first encryption key and the second encryption key without departing from the spirit and scope of the present invention. Combiner 410 may further comprise a concatenation function that concatenates one or more of first encryption key 402, second encryption key 408, or the combination of the first encryption key and the second encryption key, in order to produce a code word of a desired length, that is, a length appropriate for circular buffer 414. In another embodiment of the present invention, code word 412 may be derived from only one of first encryption key 402 or second encryption key 404, which key may be provided directly to circular buffer 414 or may be provided to the circular buffer via one or more of a concatenation function and a spreader, or multiplier.

Circular buffer 414 converts first code word 412 to circular serial data. Preferably, circular buffer 414 is a shift left register, with the most significant bit (MSB) serialized first and the least significant bit (LSB) serialized last. Each time an MSB is read out of buffer 414, the buffer is sifted one position to the left and the MSB is loaded back into the buffer as a LSB. As a result, when the code word stored in the buffer reaches the LSB of the initially stored code word, the sequence will continue again with the MSB of the initially stored code word.

A serial sequence is then read out (506) of circular buffer 414 and is routed to a code word expander 416 coupled to the buffer. Code word expander 416 expands (508) the serial sequence read out of circular buffer 414 to create a second, longer code word 418 of 128 bits from the 64 bit code word stored in circular buffer 414. Preferably, code word expander 416 is a one-half (½) convolutional encoder that is known in the art and is defined in Section 8.2.1.2.1.3 of the IEEE 802.16 standard. A one-half convolutional encoder adds redundancy to the serial sequence read out of buffer 414 to produce second code word 418 of 128 bits from a 64 bit code word stored in circular buffer 414.

Code word expander 416 conveys second code word 418 to an Exclusive OR (XOR) gate 422. However, in another embodiment of the present invention, when the serial sequence read out of buffer 414 may be of a size that does not require expansion, code word generator may not include code word expander 416. In such an embodiment, the serial sequence read out of circular buffer 414 may be routed directly to Exclusive OR (XOR) gate 422. In addition to receiving code word 418, XOR gate 422 further receives a random or pseudo-noise (PN) sequence 420. XOR gate 420 XOR's (510) code word 418 with sequence 420 produce a third code word 424. By XOR'ing code word 418 with sequence 420, the code word 'θ' provided by code word generator 212 to phase shifter 210 is further randomized, thereby making the phase shift introduced by the phase shifter even harder to detect. Preferably sequence 420 is a pilot sequence that is used to spread a pilot signal, such as a pilot sequence defined by Section 8.3.3.4.2 or Section 8.4.9.4.1 of the IEEE 802.16 standard. Such pilot sequences typically comprise the properties of a good random sequence. However, one of ordinary skill in the art realizes that any random or PN sequence may be used here.

XOR gate 422 conveys third code word 424 to a serial-to-parallel (S/P) buffer 426 that buffers (512) the code word. Signal processing unit 204 then reads (514) the code word out of S/P buffer 426 and routes the read code word 430 to a multiplier 434. In conjunction with each reading of the code word out of buffer 426, the multiplier further receives a subcarrier index 432 of multiple subcarrier indices, wherein each subcarrier index of the multiple subcarrier indices corresponds to a subcarrier of the multiple ('N') subcarriers. Multiplier 434 then multiplies (516) each code word 430 read out of buffer 426 by a subcarrier index 432 to produce a code word 436 that is associated with a subcarrier of the multiple ('N') subcarriers. By multiplying each code word received by multiplier 434 by a different subcarrier index value, which subcarrier index value is associated with a subcarrier assigned to the symbol that will be phase shifted based on the code word, code word generator 212 is able to introduce a phase shift to each symbol of the 'N' parallel symbols that is different from the phase shift introduced to the other symbols of the 'N' parallel symbols. This further increases the difficulty for an intercepting communication device to decrypt the encrypted symbols.

For example, when phase shifter 210 comprises a phase shifter module that is interposed between S/P converter 216 and transformer 218, multiplier 434 may multiply a first code word output by S/P buffer 426 by a first subcarrier index 432. The resulting codeword is then conveyed to a first phase shifter $PS_1$ of the multiple phase shifters $PS_1$-$PS_N$. Multiplier 434 may then multiply the same code word, again output by S/P buffer 426, by a second subcarrier index 432 and convey the resulting codeword to a second phase shifter $PS_2$ (not shown) of the multiple phase shifters $PS_1$-$PS_N$, and so on. Thus each code word conveyed to each phase shifter $PS_1$-$PS_N$ is different than the code words conveyed to the other phase shifters. However, in another embodiment of the present invention and in order to reduce the complexity of code word generator 212, multiplier 434 may not be included in the code word generator and the code words 430 read out of buffer 426 may not be multiplied by corresponding subcarrier index values.

Multiplier 434 then conveys each code word 436 to truncation function 438. Truncation function 438 truncates (518) each code word 436 to produce a truncated code word, which truncated code word is the code word 'θ' provided to phase shifter 210. The length of code word 'θ' is up to a designer of communication system 100 and should be a length appropriate for a level of granularity desired by the designer of communication system 100 for the phase shift introduced by phase shifter 210. Preferably, code word 'θ' is eight (8) bits; however one of ordinary skill in the art realizes that 'θ' may be any length. In another embodiment of the present invention, a length of each code word 430 read out of S/P buffer 426, or produced by multiplier 434, may be of a length appropriate for code word 'θ.' In such an embodiment, code word generator 212 may not include truncation function 438 as the code word may not need to be truncated to produce code word 'θ.' Logic flow diagram 500 then ends (520).

Figure 6:
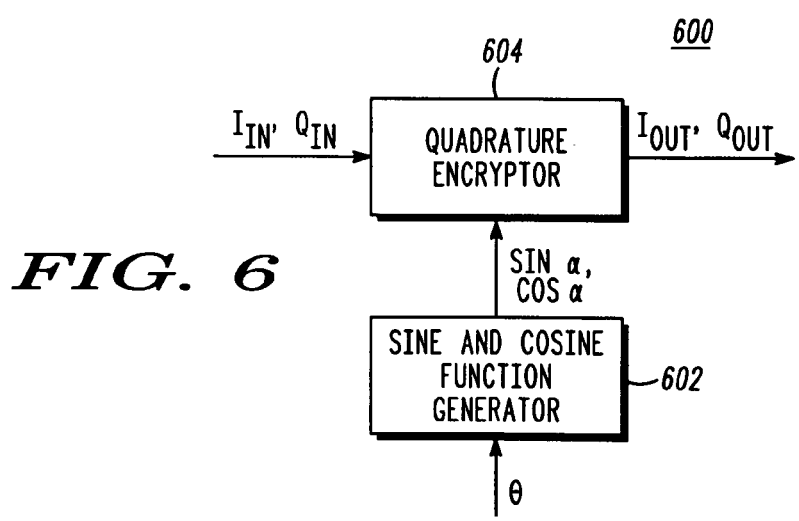
FIG. 6 is a block diagram of a phase shifter of the transmit side of FIG. 2 in accordance with an embodiment of the present invention.
Figure 7:
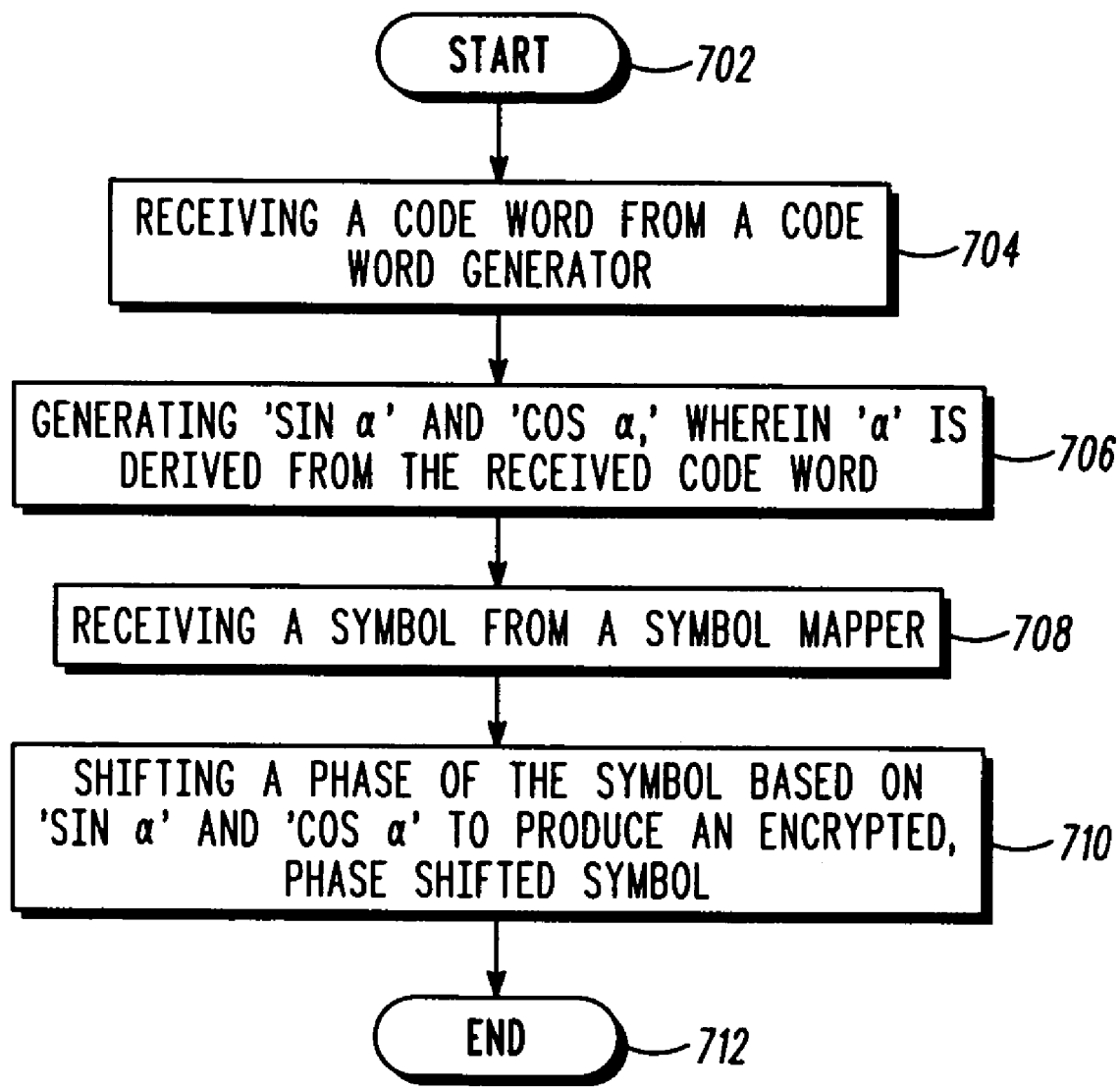
FIG. 7 is a logic flow diagram illustrating an operation of the phase shifter of the transmit side of FIG. 2 in accordance with an embodiment of the present invention.

Phase shifter 210 then uses the code word 'θ' to apply a phase shift to the symbol received by the phase shifter from symbol mapper 208. Referring now to FIGS. 6 and 7, an operation of a phase shifter 600, such as phase shifter 210, or when phase shifter 210 comprises multiple phase shifters $PS_1$-$PS_N$, each phase shifter of the multiple phase shifters $PS_1$-$PS_N$, is illustrated in accordance with an embodiment of the present invention. FIG. 6 is a block diagram of phase shifter 600 in accordance with an embodiment of the present invention. FIG. 7 is a logic flow diagram 700 illustrating a method executed by phase shifter 600 to implement a phase shift in the symbol received by the phase shifter in accordance with an embodiment of the present invention.

Logic flow diagram 700 begins (702) when phase shifter 600 receives (704) a code word 'θ' from code word generator 212. Phase shifter 600 routes the received code word to a sine and cosine function generator 602. Based on the received code word, sine and cosine function generator 602 generates (706) a first value corresponding to a sine function 'sin α' and a second value corresponding to a cosine function 'cos α,' wherein 'α' is an angle corresponding to the code word 'θ' received from code word generator 212. For example, when 'θ' is an 'n' bit code word, then α=C×(360°/$2^n$), wherein C corresponds to the value represented by the code word 'θ.' For example, suppose 'θ' is an eight (8) bit code word. Further, suppose that the code word 'θ' sourced by code word generator 212 to phase shifter 210 is '10001001.' This code word corresponds to a value of 137, and α is then equal to '137× (360°/256),' or approximately 192°. Sine and cosine function generator 602 then generates a first value corresponding to a sine of 192° and generates a second value corresponding to a cosine of 192°. Preferably, sine and cosine function generator 602 generates the values corresponding to 'sin α' and 'cos α' by reference to a lookup table maintained by at least one memory device 240. Sine and cosine function generator 602 then routes the first and second values, that is, 'sin α' and 'cos α,' to a quadrature encryptor 604.

Quadrature encryptor 604 receives the first and second values, that is, 'sin α' and 'cos α,' from sine and cosine function generator 602. Quadrature encryptor 604 further receives (708) a symbol ($I_{in}$,$Q_{in}$) produced by symbol mapper 208. Quadrature encryptor 604 then shifts (710) a phase of the symbol based on the 'sin α' and 'cos α' received from sine and cosine function generator 602 to produce an encrypted, phase shifted symbol ($I_{out}$,$Q_{out}$). More particularly, quadrature encryptor 604 produces phase shifted symbol ($I_{out}$,$Q_{out}$) by executing the following formulas maintained in at least one memory device 240:

$$I_{out}=(I_{in}\times\cos\alpha)-(Q_{in}\times\sin\alpha), \text{ and}$$

$$Q_{out}=(I_{in}\times\sin\alpha)+(Q_{in}\times\cos\alpha).$$

The phase shifted symbol ($I_{out}$,$Q_{out}$) is then conveyed by phase shifter 600 to an orthogonal modulator, such as orthogonal modulator 214, or to a transformer, such as transformer 218, whichever is appropriate, and logic flow diagram 700 then ends (712).

Figure 8:
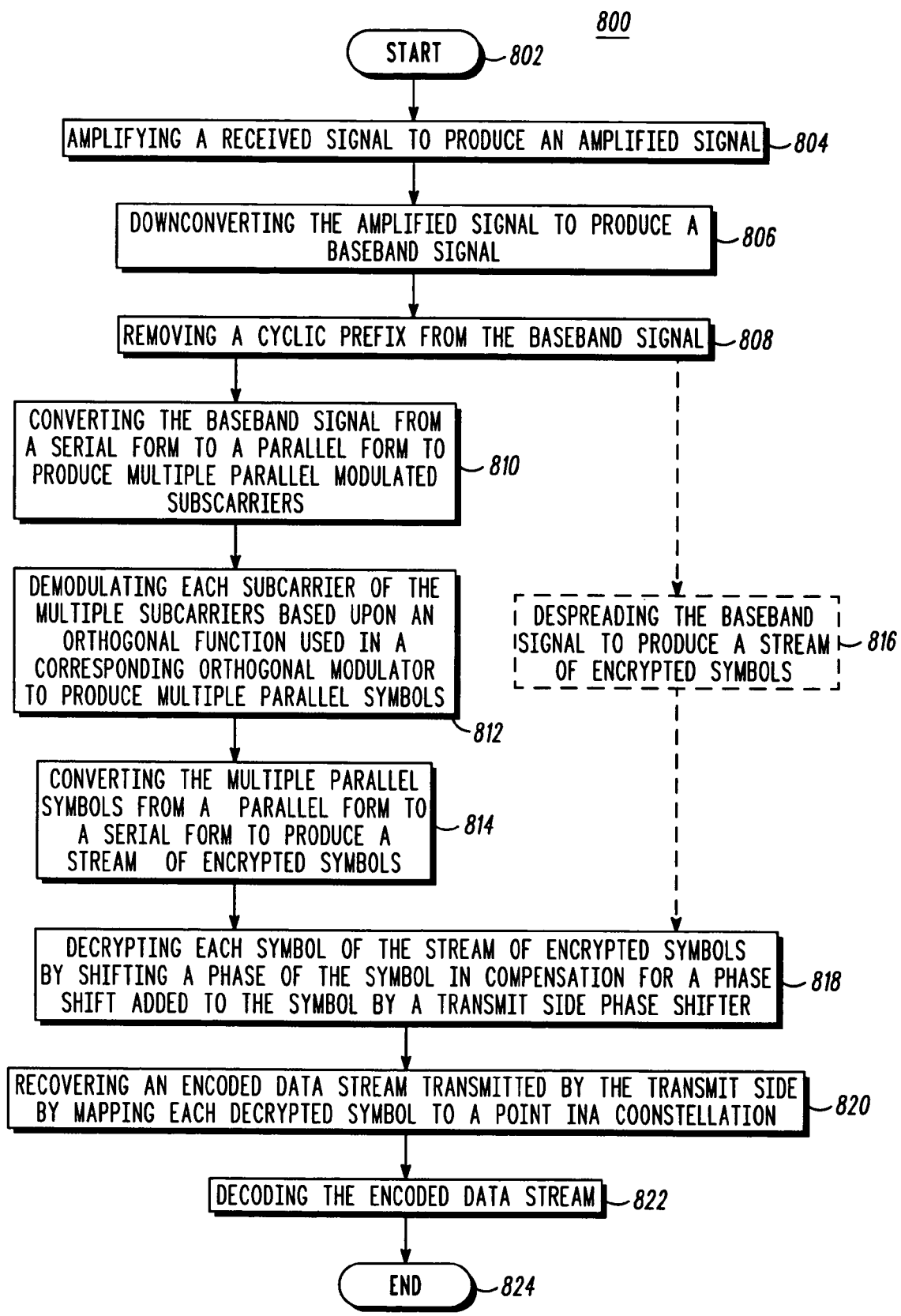
FIG. 8 is a logic flow diagram illustrating an operation of a receive side of the communication system of FIG. 2 in accordance with various embodiments of the present invention.

The receive side 250 of communication system 100 implements the reverse functions with respect to the transmit side 202. Referring now to FIG. 8, a logic flow diagram 800 is depicted that illustrates an operation of receive side 250 in accordance with an embodiment of the present invention. Logic flow 800 begins (802) when a signal received via an antenna 252 is routed to a receiver section 260, where a low noise amplifier (LNA) 262 amplifies (804) the received signal. LNA 262 then routes the amplified signal to a demodulator 264 that downconverts (806) the amplified signal from a transmit frequency to a baseband frequency. The baseband signal is then conveyed to the receive side signal processing unit 270.

Signal processing unit 270 routes the baseband signal to a cyclic prefix (C/P) remover 272 that removes (808) a cyclic prefix that had been appended to the signal. C/P remover 272 conveys the cyclic prefix-less signal to orthogonal demodulator 274. When the corresponding transmit side 202 does not include a C/P adder, then signal processing unit 270 may route the baseband signal directly to orthogonal demodulator 274. Orthogonal demodulator 274 performs an inverse function to the function performed by orthogonal modulator 214. In one embodiment of the present invention, an OFDM embodiment, orthogonal demodulator 274 comprises an S/P converter 276 coupled to an inverse transformer 278, which inverse transformer is further coupled to a P/S converter 280. In such an embodiment, orthogonal demodulator 274 routes the cyclic prefix-less signal to S/P converter 276. S/P converter 276 converts (810) the downconverted, prefix-less signal from a serial to a parallel form, outputting N parallel modulated subcarriers. The N parallel modulated subcarriers are conveyed to inverse transformer 278, such as a discrete Fourier Transform (DFT) or a fast Fourier Transform (FFT), that transforms (812) each subcarrier of the N parallel modulated subcarriers from a time domain to a frequency domain based upon a corresponding orthogonal function of the N orthogonal functions used in transformer 218. That is, inverse transformer 278 transforms each encrypted symbol to a frequency domain sub-band, or subcarrier, associated with the symbol's time domain subcarrier to produce multiple encrypted symbols. The output of inverse transformer 278 includes 'N' parallel encrypted symbols based on the 'N' modulated subcarriers, wherein each symbol of the 'N' parallel encrypted symbols is drawn from the 'M' possible symbols of the constellation used on the transmit side 202.

Transformer 278 conveys the 'N' parallel encrypted symbols to a P/S converter 280. P/S converter 280 converts (814) the 'N' parallel encrypted symbols from a parallel form to a serial form to produce a stream of encrypted symbols and conveys the symbol stream to a phase shifter 282. Phase shifter 282 decrypts (818) each encrypted symbol in the symbol stream by shifting a phase of the encrypted symbol in compensation for the phase shift added to the symbol by phase shifter 210, thereby producing multiple decrypted symbols. Phase shifter 282 then conveys each decrypted symbol to an inverse symbol mapper 286.

In another embodiment of the present invention, wherein the transmitted data includes multiple data-types, such as user data, pilot data, and synchronization data, and only the user data is encrypted by a transmit side phase shifter, then only the symbols associated with the user data are conveyed by orthogonal demodulator to phase shifter 282. Phase shifter 282 decrypts each encrypted symbol, that is, the symbols associated with the user data, by shifting a phase of the encrypted symbol in compensation for the phase shift added to the symbol by phase shifter 210 to produce a stream of decrypted symbols that is conveyed to inverse symbol mapper 286. The symbols associated with the non-user data-types are not encrypted by the transmit side and therefore are in a non-encrypted format, that is, comprise a stream of non-encrypted symbols, when output by P/S converter 280. The non-encrypted symbols may then be used for synchronization and pilot interpolation purposes, whichever is appropriate, and may be discarded without being conveyed to inverse symbol mapper 286.

Phase shifter 282 implements the phase shift of each encrypted symbol based on a same code word as the code word used to determine a phase shift in phase shifter 210, which code word is generated by a code word generator 284 coupled to phase shifter 282. For example, in one embodiment of the present invention, phase shifter 282 may subtract, from the phase of the symbol, a phase equivalent to the phase shift added to the symbol by phase shifter 210. In another embodiment of the present invention, phase shifter 282 may add a phase to the symbol that will complete a 360° rotation of the symbol around the complex plane, that is, may apply a phase shift approximately equal to '360°–θ'. For example, if phase shifter 210 applied a 192° phase shift to the symbol, then phase shifter 282 may apply a phase shift of approximately '360°–192°,' or 168°, to the symbol.

Code word generator 284 outputs code words that are synchronized with the code words output by code word generator 212. When the communication session between transmitting communication device 202 and receiving communication device 270 is first set up, signal processing unit 274 initializes code word generator 284 by inputting the session key, or a string of bits derived from the session key, and/or the mobile serial number, or a string of bits derived from the mobile serial number, into the code word generator. After the communication session is set up, each time receiving communication device 270 receives a new frame, signal processing unit 274 re-initializes code word generator 284 so that the first, in time, symbols decrypted from the new frame are decrypted based on the re-initialized code word generator.

In another embodiment of the present invention, phase shifter 282 may comprise a phase shifter module that is interposed between inverse transformer 278 and P/S converter 280 instead of succeeding the P/S converter. In such an embodiment, phase shifter 282, similar to phase shifter 210, may comprise multiple phase shifters, $PS_1$-$PS_N$, wherein each phase shifter of the multiple phase shifters is associated with, and receives from inverse transformer 278, an encrypted symbol of the multiple ('N') parallel symbols output by the inverse transformer. Each phase shifter of the multiple phase shifters $PS_1$-$PS_N$ is further associated with a corresponding one of the multiple ('N') subcarriers. In conjunction with each set of 'N' parallel symbols received by the multiple phase shifters $PS_1$-$PS_N$, each phase shifter $PS_1$-$PS_N$ receives a code word 'θ' produced by code word generator 284 that is different from the code word provided to the other phase shifters $PS_1$-$PS_N$. In response to receiving a symbol and a code word, each phase shifter $PS_1$-$PS_N$ decrypts the symbol by shifting a phase of the symbol based on the code word to produce a decrypted symbol. Each phase shifter $PS_1$-$PS_N$ then applies the decrypted symbol to P/S converter 280 for conversion from a parallel form to a serial form.

When the transmitted data includes multiple data-types, such as user data, pilot data, and synchronization data, only the encrypted symbols, that is, the symbols associated with the user data and which symbols are phase shifted by the transmit side, are conveyed by inverse transformer 278 to P/S converter 280 via a corresponding phase shifter $PS_1$-$PS_N$. The non-encrypted symbols, that is, the symbols that are associated with the one or more other data-types, for example, the pilot data and the synchronization data, and which symbols are not phase shifted by the transmit side, are conveyed directly by inverse transformer 278 to P/S converter 280. In other words, when the transmitted data includes multiple encrypted symbols associated with user data and multiple non-encrypted symbols associated with non-user data, such as pilot data or synchronization data, S/P converter 276 assigns the downconverted signal to multiple time domain subcarriers, wherein one or more time domain subcarriers of the multiple time domain subcarriers are associated with the user data and one or more time domain subcarriers of the multiple time domain subcarriers are associated with the pilot data. Inverse transformer 278 then transforms each time domain subcarrier associated with user data to a frequency domain subcarrier to produce multiple encrypted symbols and further transforms each time domain subcarrier associated with non-user data to a frequency domain subcarrier to produce multiple non-encrypted symbols. Inverse transformer 278 then conveys the encrypted symbols to phase shifter module 282, and more particularly to phase shifters $PS_1$-$PS_N$, and conveys the non-encrypted symbols to P/S converter 280. Each phase shifter $PS_1$-$PS_N$ decrypts a received encrypted symbol by shifting a phase of the symbol based on a code word to produce a decrypted symbol and conveys the decrypted symbol to P/S converter 280. P/S converter 280 then converts the decrypted symbols received from phase shifter module 282 and the non-encrypted symbols received from inverse transformer 278 from a parallel format to a serial format.

In yet another embodiment of the present invention, a CDMA embodiment, orthogonal demodulator 274 may comprise at least one despreader instead of an S/P converter, inverse transformer, and P/S converter. In such an embodiment, the at least one despreader despreads (816) a received, encrypted symbol by applying an orthogonal spreading code, that is, a CDMA subcarrier, corresponding to the orthogonal spreading code used by orthogonal modulator 214, to demodulate the received signal and to produce a stream of demodulated, that is, despread, encrypted symbols. For example, orthogonal demodulator 274 may comprise multiple serial despreaders, wherein one despreader of the multiple despreaders despreads each symbol with a long code and another despreader of the multiple despreaders spreads the symbol with a Walsh code or an OVSF. Further, in the CDMA embodiment of the present invention, signal processing unit 274 may or may not include C/P remover 272. In the CDMA embodiment, orthogonal demodulator 274 then conveys each despread, encrypted symbol to phase shifter 282. As described in detail above, phase shifter 282 then decrypts (818) each despread, encrypted symbol by shifting a phase of the symbol in compensation for the phase shift added to the symbol by phase shifter 210, thereby producing multiple decrypted symbols.

Inverse symbol mapper 286 produces a bit stream by recovering (820) the P-tuple corresponding to each decrypted symbol based on the symbol mapping scheme used by symbol mapper 208. That is, inverse symbol mapper 286 maps each symbol to a corresponding point in the constellation used by symbol mapper 208, thereby recovering the P-tuple corresponding to that point. Inverse symbol mapper 286 then conveys the recovered bit stream to a decoder 288. Decoder 288 decodes (822) the bit stream based on the error correction code applied by encoder 206 and conveys the decoded bit stream to a data sink (not shown), and logic flow 800 then ends (824).

By shifting a phase of a symbol that is to be transmitted based on information known to the transmitting and receiving communication devices, communication system 100 provides encryption at a physical layer that makes an air interface more secure against decryption by an undesired interceptor of a communication. In one embodiment of the invention, a symbol mapper included in a transmitting communication device produces multiple symbols based on a received bit stream and a symbol mapping scheme. A phase shifter included in the transmitting communication device then shifts a phase of each symbol based on a code word to produce an encrypted symbol, which code word may be generated by a code word generator based on one or more encryption keys known to both the transmitting and receiving communication devices. The encrypted symbols are then transmitted via the air interface. In turn, the receiving communication device decrypts received, encrypted symbols by shifting each received, encrypted symbol by a phase corresponding to the phase used to encrypt the symbol, thereby producing a decrypted symbol. An inverse symbol mapper then recovers the bits corresponding to each decrypted symbol based on the symbol mapping scheme used by the transmitting device symbol mapper.

While the present invention has been particularly shown and described with reference to particular embodiments thereof, it will be understood by those skilled in the art that various changes may be made and equivalents substituted for elements thereof without departing from the scope of the invention as set forth in the claims below. Furthermore, one of ordinary skill in the art realizes that the components and operations of the transmitting communication device and receiving communication device detailed herein are not intended to be exhaustive but are merely provided to enhance an understanding and appreciation for the inventive principles and advantages of the present invention, rather than to limit in any manner the invention. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for encrypting a wireless transmission comprising:
   receiving a plurality of symbols, wherein the plurality of symbols comprises symbols associated with user data and symbols associated with pilot data;
   shifting a phase of each symbol of the plurality of symbols to produce a plurality of phase shifted symbols, wherein shifting comprises shifting a phase of each symbol that is associated with user data to produce a plurality of phase shifted symbols and not shifting a phase of each symbol that is associated with pilot data to produce a plurality of non-shifted symbols;
   modulating each phase shifted symbol of the plurality of phase shifted symbols with a first orthogonal subcarrier and modulating each non-shifted symbol of the plurality of non-shifted symbols with a second orthogonal subcarrier to produce a plurality of modulated subcarriers; and
   transmitting the plurality of modulated subcarriers via a wireless link.

2. The method of claim 1, wherein modulating comprises spreading each phase shifted symbol of the plurality of phase shifted symbols by at least one spreading code, wherein the plurality of modulated subcarriers comprises the plurality of symbols spread by the at least one spreading code and wherein transmitting comprises upconverting the plurality of modulated subcarriers from a baseband frequency to a transmit frequency to produce an upconverted signal, amplifying the upconverted signal to produce an amplified signal, and transmitting the amplified signal.

3. The method of claim 1, wherein receiving a plurality of symbols comprises:
   receiving a bit stream; and
   mapping the bit stream to a constellation of symbols to produce a plurality of symbols.

4. The method of claim 1, wherein the plurality of phase shifted symbols comprises a stream of phase shifted symbols and wherein modulating comprises:

assigning each phase shifted symbol of the plurality of phase shifted symbols to a frequency sub-band of a plurality of frequency sub-bands; and transforming each phase shifted symbol to a time domain subcarrier associated with the phase shifted symbol's frequency sub-band to produce a plurality of modulated time domain subcarriers.

5. The method of claim 4, wherein the plurality of modulated time domain subcarriers are in a parallel form and wherein transmitting comprises:

converting the plurality of modulated subcarriers from a parallel form to a serial form to produce an output signal; and transmitting the output signal via a wireless link.

6. The method of claim 1, wherein shifting comprises:

assigning each user data symbol a frequency sub-band of a plurality of frequency sub-bands to produce a plurality of assigned symbols;

shifting a phase of each assigned user data symbol to produce a plurality of phase shifted user data symbols; and wherein modulating comprises transforming each phase shifted user data symbol to a time domain subcarrier associated with the phase shifted user data symbol's frequency sub-band to produce a plurality of modulated time domain subcarriers.

7. The method of claim 6, wherein the plurality of modulated time domain subcarriers are in a parallel form and wherein transmitting comprises:

converting the plurality of modulated time domain subcarriers from a parallel form to a serial form to produce an output signal; and transmitting the output signal via a wireless link.

8. The method of claim 1, wherein shifting a phase comprises shifting a phase of each user data symbol based on a code word derived from at least one of a session key and a mobile serial number.

9. The method of claim 8, wherein shifting a phase comprises:

generating a code word based on at least one of a session key and a mobile serial number; and for each user data symbol, generating a sin α and a cos α, wherein α is derived from the code word; and shifting a phase of the symbol based on the sin α and the cos α to produce a phase shifted user data symbol.

10. The method of claim 1, wherein shifting a phase comprises shifting a phase of each user data symbol based on a code word of a plurality of code words, and wherein the method further comprises:

loading a buffer with a bit sequence based on at least one of a session key and a mobile serial number;

reading a serial sequence out of the buffer;

exclusive or'ing the serial sequence with a different sequence to produce a code word; and multiplying the code word by each subcarrier index of a plurality of subcarrier indices to produce the plurality of code words.

11. A communication device comprising:

a signal processing unit comprising:

a phase shifter that receives a plurality of symbols and applies a phase shift to each symbol of the plurality of symbols to produce a plurality of phase shifted symbols, wherein the plurality of symbols comprises symbols associated with user data and symbols associated with pilot data and wherein shifting comprises shifting a phase of each symbol that is associated with user data to produce a plurality of phase shifted symbols and not shifting a phase of each symbol that is associated with pilot data to produce a plurality of non-shifted symbols;

an orthogonal modulator that receives the plurality of phase shifted symbols, receives the plurality of non-shifted symbols associated with pilot data, modulates each phase shifted symbol of the plurality of phase shifted symbols with a first orthogonal subcarrier, and modulates each non-shifted symbol of the plurality of non-shifted symbols with a second orthogonal subcarrier to produce a plurality of modulated subcarriers; and a transmitter section coupled to the signal processing unit that transmits the plurality of modulated subcarriers via a wireless link.

12. The communication device of claim 11, wherein the orthogonal modulator comprises at least one spreader, wherein the at least one spreader modulates each phase shifted symbol of the plurality of phase shifted symbols by spreading the phase shifted symbol by at least one spreading code, and wherein the plurality of modulated subcarriers comprises the plurality of symbols spread by the at least one spreading code.

13. The communication device of claim 11, wherein the communication device further comprises a symbol mapper that receives a bit stream, maps the bit stream to a constellation of symbols to produce the plurality of symbols, and conveys the plurality of symbols to the phase shifter.

14. The communication device of claim 11, wherein the plurality of phase shifted symbols comprises a stream of phase shifted symbols and wherein the orthogonal modulator comprises:

a serial-to-parallel converter that assigns each phase shifted symbol of the plurality of phase shifted symbols to a frequency sub-band of a plurality of frequency sub-bands; and a transformer that transforms each phase shifted symbol to a time domain subcarrier associated with the symbol's frequency sub-band to produce a plurality of modulated time domain subcarriers, wherein the plurality of modulated subcarriers are in a parallel form; and a parallel-to-serial converter that converts the plurality of modulated subcarriers from a parallel form to a serial form to produce an output signal; and wherein the transmitter section transmits the at least one modulated subcarrier by transmitting the output signal via the wireless link.

15. The communication device of claim 11, further comprising a code word generator coupled to the phase shifter that generates a plurality of code words based on at least one of a session key and a mobile serial number and wherein the phase shifter shifts a phase of each user data symbol based on a code word of the plurality of code words.

16. The communication device of claim 15, wherein the code word generator comprises:

a buffer that stores a bit sequence based on at least one of the session key and the mobile serial number;

an Exclusive OR function that receives a serial sequence based on the bit sequence stored in the buffer and exclusive OR's the serial sequence with a different sequence to produce a code word; and a multiplier that multiplies the code word by each subcarrier index of a plurality of subcarrier indices to produce a plurality of code words.

17. The communication device of claim 15, wherein the phase shifter comprises:

a sine and cosine function generator that, for each symbol of the plurality of symbols, generates a sin α and a cos α, wherein α is derived from a code word of the plurality of code words; and a quadrature encryptor coupled to the sine and cosine function generator that, for each user data symbol, shifts a phase of the user data symbol based on the sin α and the cos α generated with respect to that symbol to produce a phase shifted user data symbol.

* * * * *